(12) United States Patent
Jang et al.

(10) Patent No.: US 10,920,868 B2
(45) Date of Patent: Feb. 16, 2021

(54) KEYLESS ROTATION TRANSFER UNIT AND HYBRID STARTER AND GENERATOR

(71) Applicants: HYUNDAI MOTOR COMPANY, Seoul (KR); KIA MOTORS CORPORATION, Seoul (KR)

(72) Inventors: Yong-Sung Jang, Hwaseong-si (KR); Jae-Won Ha, Hwaseong-si (KR); Woo-Hyung Seol, Seoul (KR); Ji-Yeon Kim, Gangwon-do (KR); Hee-Ra Lee, Anyang-si (KR); Myung-Gyu Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 541 days.

(21) Appl. No.: 15/801,876

(22) Filed: Nov. 2, 2017

(65) Prior Publication Data
US 2018/0163840 A1   Jun. 14, 2018

(30) Foreign Application Priority Data
Dec. 12, 2016   (KR) .......................... 10-2016-0168665

(51) Int. Cl.
*F16H 7/20*   (2006.01)
*F16H 57/00*   (2012.01)
(Continued)

(52) U.S. Cl.
CPC ........... *F16H 57/0025* (2013.01); *B60K 6/26* (2013.01); *F02N 11/00* (2013.01); *F02N 11/04* (2013.01); *F02N 15/006* (2013.01); *F02N 15/08* (2013.01); *F16D 1/076* (2013.01); *F16D 1/10* (2013.01); *F16D 1/108* (2013.01);
(Continued)

(58) Field of Classification Search
CPC .................................. F16H 7/20; F16H 55/36
See application file for complete search history.

(56) References Cited

U.S. PATENT DOCUMENTS 2,917,935 A * 12/1959 Haug ....................... F16H 55/36
474/84
4,854,192 A * 8/1989 Churchill .................. F16H 3/54
475/256
(Continued)

FOREIGN PATENT DOCUMENTS

DE   10 2005 002 029   * 7/2006   .............. F02B 67/06
FR   2 894 007   * 6/2007   .............. F16H 7/20
KR   10-1091672 B1   12/2011

*Primary Examiner* — Michael P Ferguson
(74) *Attorney, Agent, or Firm* — Brinks Gilson & Lione

(57) ABSTRACT

A keyless rotation transfer unit may include a spline forming a pulley coupling force between an inner circumference of a shaft hole of a pulley and an outer circumference of a keyless shaft end forming one end of a shaft, with the keyless shaft end inserted into the shaft hole, and a flange nut screw-fastened to the keyless shaft end coming out of the shaft hole and forming a screw fastening force to press one surface of the pulley. In particular, the screw fastening force forms a shaft fastening force that causes a bearing to pressurize the other surface of the pulley, the bearing is coupled to the keyless shaft end and located at the rear of the pulley, and the flange nut forms a pulley holding force using the screw fastening force and the shaft fastening force.

6 Claims, 5 Drawing Sheets

(51) Int. Cl.
*F16D 1/10* (2006.01)
*B60K 6/26* (2007.10)
*F02N 11/00* (2006.01)
*F02N 15/00* (2006.01)
*F16D 1/076* (2006.01)
*F02N 11/04* (2006.01)
*F02N 15/08* (2006.01)
*F16D 1/108* (2006.01)
*F16H 55/36* (2006.01)
*F16C 35/063* (2006.01)

(52) U.S. Cl.
CPC ..... *B60K 2006/268* (2013.01); *B60Y 2200/92* (2013.01); *B60Y 2400/47* (2013.01); *F16C 35/063* (2013.01); *F16D 2001/103* (2013.01); *F16H 55/36* (2013.01); *Y10S 903/906* (2013.01)

(56) References Cited

U.S. PATENT DOCUMENTS

| | | | | |
|---|---|---|---|---|
| 5,507,586 | A * | 4/1996 | Myszka | F16D 1/06 403/365 |
| 6,286,293 | B1 * | 9/2001 | Scag | A01D 34/6806 56/17.5 |
| 6,786,316 | B2 * | 9/2004 | Jacobson | F16D 27/112 192/84.94 |
| 7,207,910 | B2 * | 4/2007 | Dell | F16H 55/36 474/74 |
| 9,897,190 | B2 * | 2/2018 | Yu | F16H 55/36 |
| 2015/0141184 | A1 * | 5/2015 | Yu | H02K 5/20 474/168 |

* cited by examiner

KEYLESS ROTATION TRANSFER UNIT AND HYBRID STARTER AND GENERATOR

CROSS-REFERENCE TO RELATED APPLICATION

This application claims priority to and the benefit of Korean Patent Application No. 10-2016-0168665, filed on Dec. 12, 2016, which is incorporated herein by reference in its entirety.

FIELD

The present disclosure relate to a hybrid starter and generator, and more particularly, to a hybrid starter and generator having a rotation transfer unit applied thereto.

BACKGROUND

The statements in this section merely provide background information related to the present disclosure and may not constitute prior art.

In general, an HEV (Hybrid Electronic Vehicle) based on a TMED (Transmission Mounted Electric Device) (hereafter, referred to as TMED HEV) includes an HSG (Hybrid Starter & Generator) which is rotated by an engine connected thereto and applied separately from a driving motor.

For this structure, the HSG includes a power transmission structure using a pulley tied to a belt connected to the engine, and a pulley toughness structure based on a key holding force formed by an HSG shaft and a key and a nut holding force formed by the HSG shaft and a flange nut is applied to the power transmission structure. The HSG stably transmits power when the TMED HEV is operated.

Therefore, the TMED HEV can not only provide an engine start function and a high-voltage battery charge function during operation through the HSG, but also increase the degree of freedom of an engine room and the power generation efficiency while adjusting power generation depending on a load, unlike a vehicle in which a starter and a generator are separately installed.

However, the engine operation condition of the TMED HEV, which reaches a maximum torque of 43.2 Nm and a high revolution number of 15,000 RPM (Revolution Per Minute), is transmitted to the HSG through the pulley, and the pulley is rotated while being thermally expanded and receiving a belt load caused by engine power transmission. Thus, the TMED HEV inevitably has difficulties in coping with a reduction in pulley toughness with time.

For example, the belt load and thermal expansion, which are applied to the pulley when the designed durable period of the pulley toughness structure expires, may vibrate the pulley. The vibration of the pulley may reduce the durability of the portion where the key holding force is formed, and the reduction of the durability may form a key gap between the HSG shaft and the pulley. Then, the key gap may serve as a path through which dusts or foreign matters are introduced toward the flange nut along the HSG shaft under the environment of the engine room, and the accumulated foreign matters may form a nut gap between the flange nut and the pulley. The nut gap may reduce the holding force between the HSG shaft and the flange nut, thereby rotating the flange nut.

In particular, when a bond stiffening layer vulnerable to heat is applied between a bearing coupled to the HSG shaft and a stopper for limiting a bearing location in the power transmission structure of the HSG, adverse effects caused by thermal expansion inevitably deepen.

Thus, during the HSG operation, the flange nut may cause noise and damage the pulley. Furthermore, the flange nut may be separated to make it impossible to transmit power.

SUMMARY

The present disclosure provides a keyless rotation transfer unit which can improve a holding force at a plurality of locations through coupling between a shaft receiving a rotational force and a pulley transmitting a rotational force, thereby increasing a transfer torque of the pulley and improving a slip prevention function. In addition the keyless rotation transfer unit may maintain the robustness of an axial holding force of the pulley even though thermal expansion and belt tension are applied to the pulley rotated at high torque and high speed, thereby maintaining a foreign matter blocking function even after a designed durable period expires. The keyless rotation transfer unit may be included in a hybrid starter and generator.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as described and combinations thereof.

In one form of the present disclosure, there is provided a keyless rotation transfer unit including: a spline configured to form a pulley coupling force between an inner circumference of a shaft hole of a pulley and an outer circumference of a keyless shaft end forming one end of a shaft, with the keyless shaft end inserted into the shaft hole of the pulley; and a flange nut screw-fastened to the keyless shaft end coming out of the shaft hole and configured to form a screw fastening force to press a first surface of the pulley. In particular, the screw fastening force forms a shaft fastening force that causes a bearing to pressurize a second surface of the pulley, the bearing is coupled to the keyless shaft end and located at the rear of the pulley, and the flange nut is configured to form a pulley holding force via the screw fastening force and the shaft fastening force.

The keyless shaft end may be divided into a coupled section where the bearing and the pulley are coupled to each other and a fixed section which is extended from the coupled section and to which the flange nut is screw-fastened.

The coupled section of the keyless shaft end may have a shaft spline protruding from the outer circumference of the keyless shaft end, the shaft hole may have a pulley spline recessed in the inner circumference of the shaft hole, and the pulley spline and the shaft spline may constitute the spline of the keyless rotation transfer unit to form the pulley coupling force. The pulley coupling force may be adjusted based on the length of the pulley spline and the shaft spline and based on the intervals at which the pulley splines and the shaft splines are formed. The length of the pulley spline may be set to ½ or more of the axial length of the shaft hole, and the intervals may be set to intervals of 90 degrees or less.

The fixed section of the keyless shaft end may have a male screw formed on the outer circumference thereof, and the male screw may be coupled to a male screw of the flange nut so as to form the pulley holding force.

The pulley may have a pulley boss formed at one side thereof, the pulley boss forming the shaft hole, and a nut space configured to house the flange nut may be formed at the opposite side of the pulley.

In another form of the present disclosure, there is provided a hybrid starter and generator ("HSG") including: a keyless rotation transfer unit including: a pulley having a pulley spline processed on an inner circumference of a shaft hole; a shaft having a shaft spline processed on an outer circumference of a keyless shaft end; and a flange nut configured to form a pulley holding force of the pulley via a screw fastening force formed by the keyless shaft end screwed thereto and a shaft fastening force formed by a reaction force of a bearing located at the rear of the pulley, while a pulley coupling force of the pulley is formed by coupling between the pulley spline and the shaft spline; and a core configured to rotate the keyless rotation transfer unit or be rotated by the keyless rotation transfer unit.

The shaft may have a coupled section which is spline-coupled to the pulley located at the front of the bearing coupled to the shaft and a fixed section which is screw-fastened to the flange nut.

Between the bearing and the core, a stopper may be installed. The stopper may be coupled to the shaft or integrated with the shaft, while having a larger diameter than a diameter of the keyless shaft end.

A bond stiffening layer may be formed on a contact surface between the stopper and the bearing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
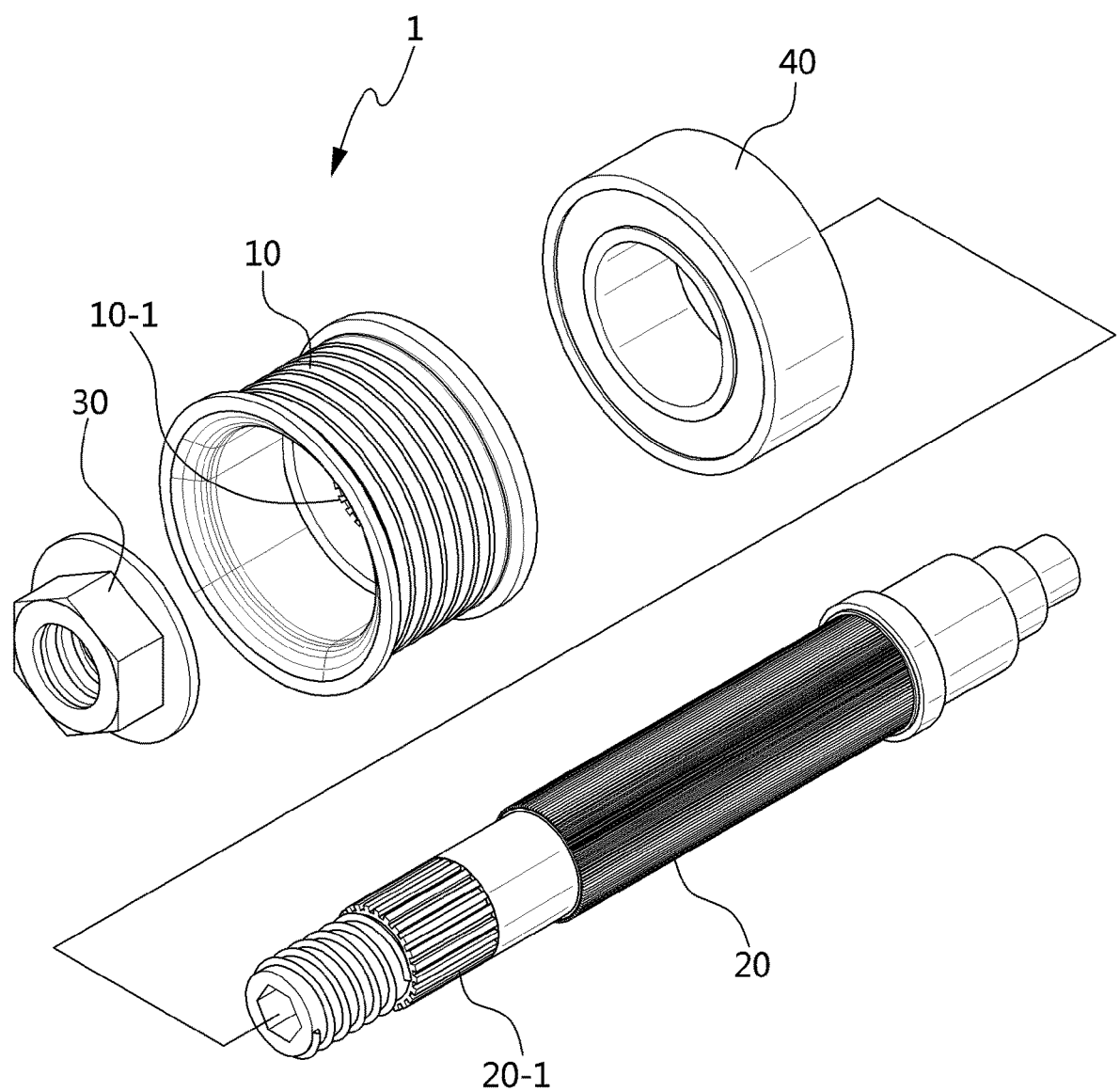
FIG. 1 is a configuration diagram of a keyless rotation transfer unit.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, in one form of the present disclosure, a keyless rotation transfer unit 1 includes a pulley 10 having a pulley spline 10-1 processed therein, a shaft 20 having a shaft spline 20-1 processed thereon, a flange nut 30, and a bearing 40.

Specifically, the pulley 10 and the bearing 40 are coupled to the shaft 20, and the flange nut 30 is fastened to the shaft 20. For example, the bearing 40 is coupled to the shaft 20 at a location beyond the shaft spline 20-1 and supports the shaft 20 which is rotated with the pulley 10. The pulley 10 is spline-coupled to the shaft 20 through the pulley spline 10-1 and the shaft spline 20-1, and transmits a rotational force to the shaft 20. The flange nut 30 is screwed to an end portion of the shaft 20 spline-coupled to the pulley 10, and maintains a state in which the pulley 10 and the bearing 40 are assembled to the shaft 20.

In one form, the pulley 10 of the keyless rotation transfer unit 1 is spline-coupled to the shaft 20, and the pulley 10 is fixed to the shaft 20 through the screw coupling. Thus, the assembling process between the pulley 10 and the shaft 20 can be simplified, compared to an existing key structure which applies a key to couple the pulley 10 and the shaft 20.

Figure 2A:
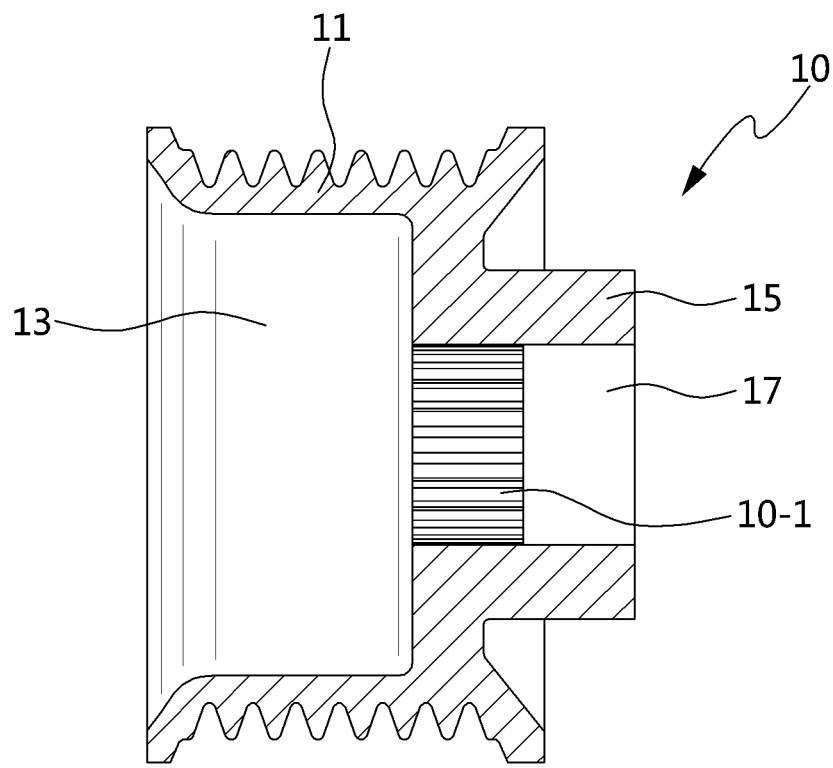
FIGS. 2A-2C are are diagrams illustrating a spline structure of a pulley.
Figure 2B:
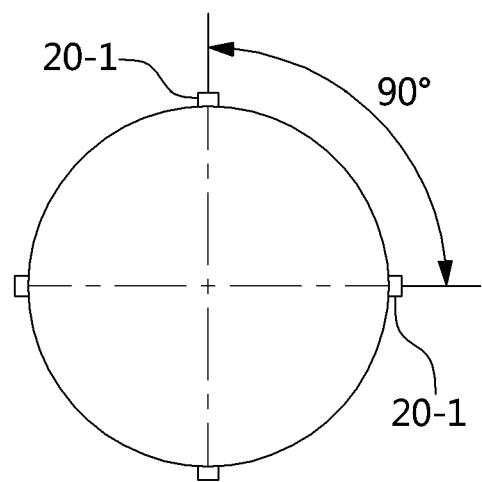
Figure 2C:
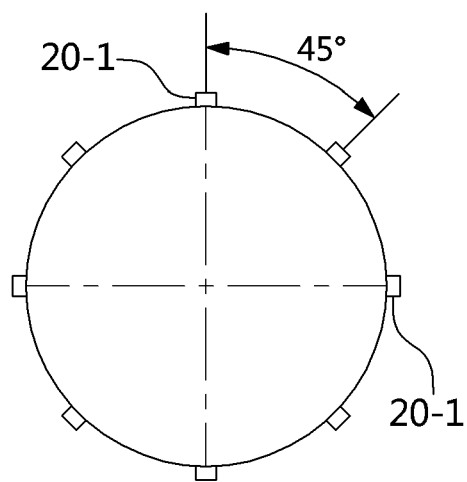

Referring to FIGS. 2A-2C, the pulley 10 includes a pulley body 11, a nut space 13, a pulley boss 15, and a shaft hole 17, and the pulley spline 10-1 is processed in the shaft hole 17. Thus, unlike the existing key structure which has difficulties in managing foreign matters due to a key groove formed by a broaching process, foreign matters can easily managed during pulley processing, because the pulley spline 10-1 of the pulley 10 is processed through a hobbing process.

For example, the pulley body 11 may reduce or prevent a separation of a belt coupled to the outer circumference thereof, using flanges formed at the left and right sides thereof, and have the nut space 13 formed at one side (left side) thereof and the pulley boss 15 formed at the other side (right side) thereof. The flange nut 30 is housed in the nut space 13, and the shaft hole 17 communicating with the nut space 13 is formed in the pulley boss 15.

The pulley spline 10-1 is processed through a hobbing process on the inner circumferential surface of the shaft hole 17, and formed across a section corresponding to ½ of the axial length of the shaft hole 17 from an inner portion of the shaft hole 17 (where the end of the shaft 20 escapes to the nut space 13 from the shaft hole 17). Therefore, the pulley spline 10-1 is formed as a groove.

The length of the pulley spline 10-1 may be adjusted to control the coupling force between the pulley 10 and the shaft 20. For example, the pulley spline 10-1 may be formed across the entire section or ⅔ section of the axial length of the shaft hole 17. Furthermore, the number of pulley splines 10-1 may be adjusted to control the coupling force between the pulley 10 and the shaft 20. For example, as illustrated in FIGS. 2B-2C, the pulley splines 10-1 may be formed at intervals of 90 degrees, formed at internals of 45 degrees, or successively formed at no intervals therebetween, along the outer circumference of the circular cross-section of the shaft hole 17, while having a predetermined size.

Figure 3A:
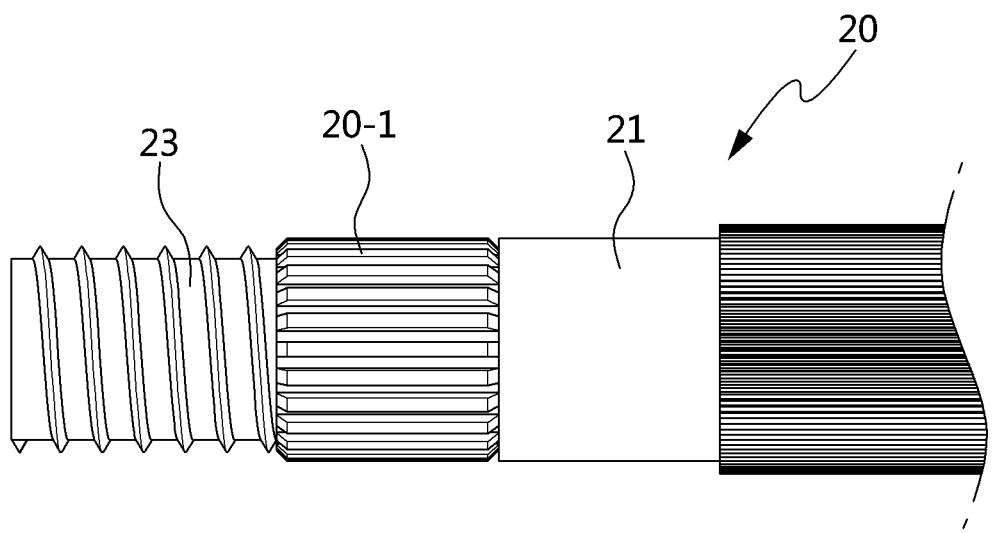
FIGS. 3A-3C are are diagrams illustrating a spline structure of a rotating body.
Figure 3B:
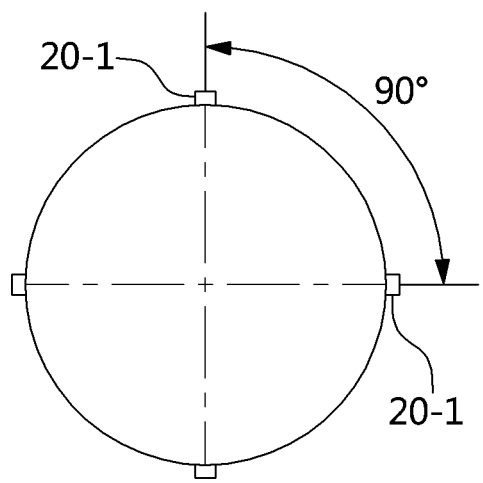
Figure 3C:
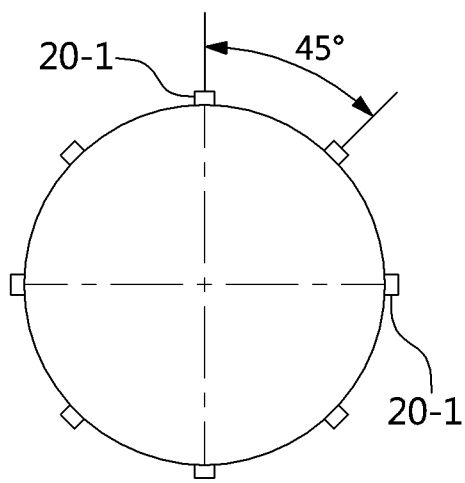

Referring to FIGS. 3A-3C, the shaft 20 which is a shaft body coupled to a rotating body is formed in a straight line shape having a predetermined length, and has a keyless shaft end where the bearing 40, the pulley 10 and the flange nut 30 are sequentially arranged, the keyless shaft end being formed at one end of the shaft body. In particular, since the keyless shaft end has a smaller diameter than a diameter of the shaft body, the shaft 20 has a double concentric structure. As a result, the location of the bearing 40 fitted to the keyless shaft end is constrained by a stepped portion formed by a difference in diameter between the keyless shaft end and the shaft body at the end of the shaft body from which the keyless shaft end starts.

For example, the keyless shaft end is divided into a coupled section 21 and a fixed section 23, and has a length corresponding to the length of the structure in which the bearing 40, the pulley 10 and the flange nut 30 are coupled.

The coupled section 21 is connected from a location beyond the section of the shaft body which is covered by the rotating body, and the fixed section 23 is extended from the coupled section 21 and forms one end of the shaft body.

The coupled section 21 has the shaft splines 20-1 formed as protrusions on the outer circumferential surface thereof. Specifically, the shaft splines 20-1 are formed at a section excluding the width of the bearing 40, and are fitted and coupled to the pulley splines 10-1 formed as grooves. The shaft spline 20-1 has the same length as the pulley spline 10-1 formed on the pulley 10. As illustrated in FIGS. 3A-3C, based on the number of pulley splines 10-1, the shaft splines 20-1 are formed at intervals of 90 degrees or 45 degrees or no intervals, along the outer circumference of the circular cross-section of the shaft 20. Thus, the length of the coupled section 21 is equal to the sum of the length of the pulley spline 10-1 and the width of the bearing 40.

The fixed section 23 has a male screw formed on the outer circumferential surface thereof, and is coupled to a female screw of the flange nut 30. The length of the fixed section 23 may be equal to the width of the flange nut 30.

Figure 4:
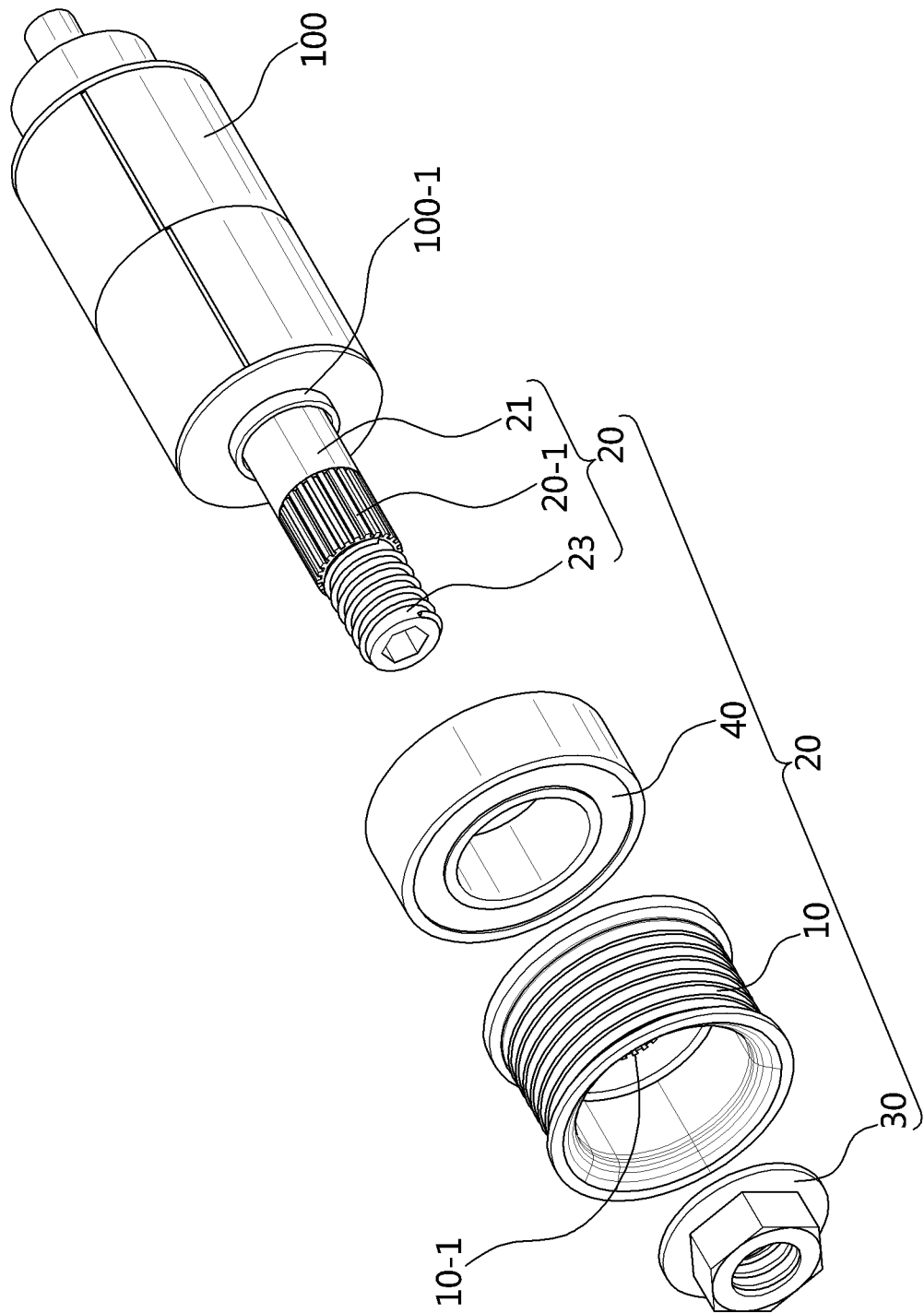
FIG. 4 is a configuration diagram of a hybrid starter and generator to which the keyless rotation transfer unit is applied.
Figure 5:
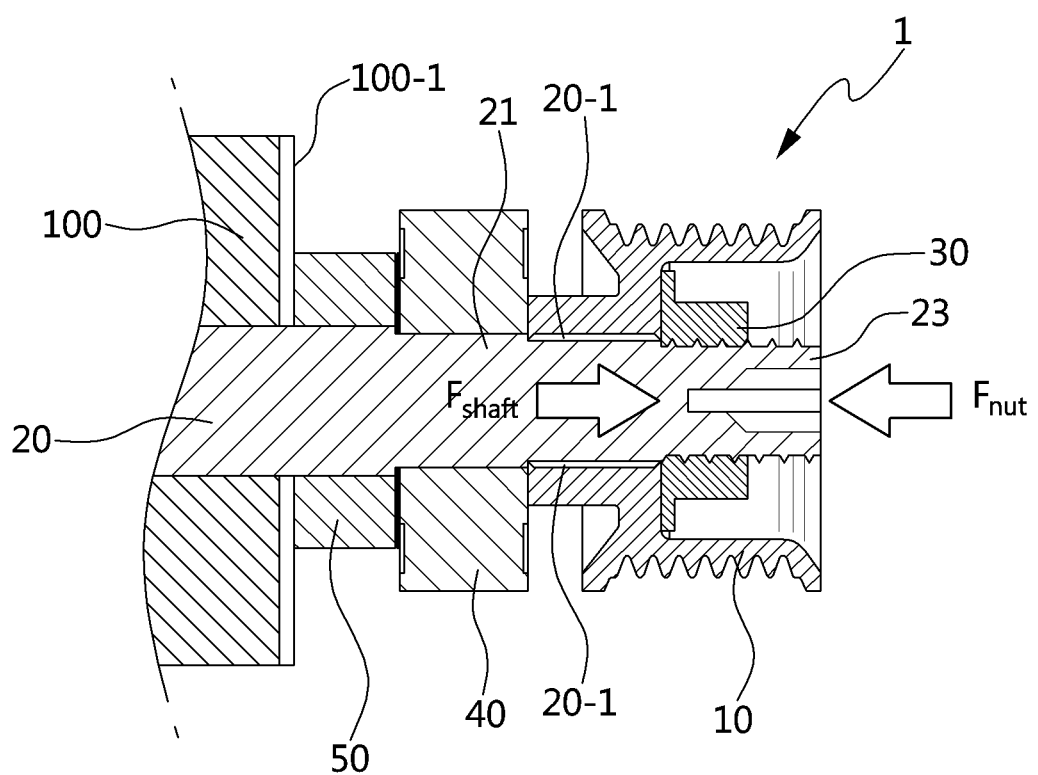
FIG. 5 is a diagram illustrating a state in which the keyless rotation transfer unit is coupled to a shaft of the hybrid starter and generator.

FIGS. 4 and 5 illustrate an example in which the keyless rotation transfer unit 1 is applied to an HSG.

Referring to FIG. 4, the HSG 100 includes a shaft 20 coming out of a core 100-1, and the shaft 20 constitutes a keyless rotation transfer unit 1.

The keyless rotation transfer unit 1 includes a pulley 10 having pulley splines 10-1 processed therein, a shaft 20 having shaft splines 20-1 processed thereon, a flange nut 30, and a bearing 40, and thus has the same structure as the keyless rotation transfer unit 1 described with reference to FIGS. 1 to 3C. The flange nut 30 may include a typical flange nut, but a flange nut which is modified according to the specification and structure of the HSG 100 may be applied. The bearing 40 may include a roller bearing, but various types of bearings may be applied according to the specification and structure of the HSG 100.

The HSG 100 includes an HSG shaft for outputting a rotational force generated by the core 100-1 or transmitting a rotational force to the core 100-1. The core 100-1 indicates a motor body including a stator core and a stator. The stator core is made of electrical steel, and the stator includes a coil wound around the stator core. However, the HSG shaft includes shaft splines formed on the outer circumferential surface of the shaft body, and has the same structure as the shaft 20 which has the shaft splines 20-1 formed thereon and constitutes the keyless rotation transfer unit 1. Thus, the HSG shaft may be referred to as the shaft 20. FIG. 4 illustrates a state in which an HSG housing is removed from the HSG 100. In one form, the HSG 100 may house the core 100-1 in the HSG housing, and block the bearing 40 of the keyless rotation transfer unit 1 from outside.

Therefore, the HSG 100 is applied to a TMED HEV having a motor mounted in a transmission, which starts an engine, charges a high-voltage battery during operation and adjusts power generation depending on an engine load. However, the TMED HEV is only an example, and the HSG 100 can be applied to all types of HEVs to which the HSG 100 can be applied.

Referring to FIG. 5, the bearing 40, the pulley 10, and the flange nut 30 are coupled to the HSG 100, with the keyless shaft end set to a core-exposed section of the shaft 20. FIG. 5 illustrates a state in which the HSG housing for shielding the core 100-1 and the bearing 40 from outside is removed. In another form, the HSG housing may cover the core 100-1 and the bearing 40 from outside, and the HSG 100 may be divided into the HSG housing and the pulley 10 having the flange nut 30 housed in the nut space 13.

When the keyless rotation transfer unit 1 is assembled to the shaft 20 of the HSG 100, the bearing 40 is coupled to the shaft 20 and located at the core 100-1, the pulley 10 is coupled to the shaft 20 and located at the front of the bearing 40, and the flange nut 30 is coupled to the shaft 20 while being completely housed in the nut space 13 of the pulley 10. As a result, the pulley 10 and the shaft 20 are fastened through the pulley splines 10-1 of the pulley 10 and the shaft splines 20-1 of the shaft 20, and the flange nut 30 and the shaft 20 are screwed to each other.

Between the bearing 40 and the core 100-1, a stopper 50 is located. The stopper 50 constrains the location of the bearing 40 while maintaining a gap therebetween such that the side surface of the bearing 40 does not come in direct contact with the exposed surface of the core 100-1. The stopper 50 may be integrated with the shaft 20 so as to form a concentric circle with the shaft 20. In another form, the stopper 50 may be separately manufactured in a ring shape, and coupled to the shaft 20 so as to be located between the core 100-1 and the bearing 40. However, the stopper 50 may not be applied depending on the specification and structure of the HSG 100. Furthermore, a bond stiffening layer may be applied to the contact surface between the stopper 50 and the bearing 40.

Thus, when the pulley 10 transfers a rotational force of the engine to the HSG 100 through a belt, a screw fastening force "Fnut" of the flange nut 30 strongly pushes the pulley 10 spline-coupled to the shaft 20, the pushing of the pulley 10 forms a shaft fastening force "Fshaft" of the shaft 20 based on a reaction force of the bearing 40 which is coupled to the shaft 20 at the rear of the pulley 10, and the interaction between the screw fastening force "Fnut" and the shaft fastening force "Fshaft" forms a pulley holding force to strongly press the left and right side surfaces of the pulley 10, thereby maintaining the pulley toughness of the pulley 10. That is, the screw-fastening of the flange nut 30 to the shaft 20 forms the pulley holding force using the screw fastening force and the shaft fastening force.

As a result, the keyless rotation transfer unit 1 has a simpler assembly process between the pulley 10 and the shaft 20 than the existing key structure which applies a key to couple the pulley 10 and the shaft 20, and can maintain the pulley toughness structure even though thermal expansion occurs due to high temperature while a belt load of the belt is applied to the pulley 10, the belt transferring a rotational force of the engine in a TMED HEV having an operation condition set to a torque of 43.2 Nm and a rotation number of 15,000 RPM. Furthermore, even after the designed durable period expires, the keyless rotation transfer unit 1 can block an introduction of foreign matters due to vibration, and prevent or inhibit loosening of the flange nut 30.

As described above, the hybrid starter and generator in the present form includes the keyless rotation transfer unit 1 which includes the pulley 10 having the pulley splines 10-1 processed therein; the shaft 20 having the shaft splines 20-1 processed thereon; and the flange nut 30 forming a pulley holding force of the pulley 10 using a screw fastening force formed by the keyless shaft end thereto and a reaction force of the bearing 40 located at the rear of the pulley 10, while a pulley coupling force of the pulley 10 is formed by the coupling between the pulley splines 10-1 and the shaft splines 20-1. As a result, the hybrid starter and generator can improve a slip prevention function while increasing the transfer torque of the pulley 10. In particular, although thermal expansion and belt tension are applied to the pulley 10 rotated at high torque and high speed, the robustness of the axial holding force of the pulley 10 can be maintained. Therefore, the foreign matter blocking function can be maintained even after the designed durable period expires.

In the exemplary forms of the present disclosure, since the keyless rotation transfer unit is applied the HSG shaft, the HSG has the following advantages and effects.

First, the HSG stably transfers a torque without a slip of the pulley under an engine operation condition of a TMED HEV, which reaches a maximum torque of 43.2 Nm and a high revolution number of 15,000 RPM. Second, the robustness of the shaft holding force and the flange nut holding force can be maintained under the environment where thermal expansion occurs while belt tension caused by a belt for transmitting a rotational force of the engine is applied. Third, since the robustness of the shaft holding force and the nut holding force is maintained, the HSG operation performance can be guaranteed even after the designed durable period expires. Fourth, since the shaft holding force is formed at a plurality of locations by the spline structure between the shaft and the pulley, the pulley can be processed through a hobbing process which can easily manage foreign matters, instead of a broaching process. Fifth, since foreign matters are easily managed, an occurrence of quality problem in the HSG can be inhibited or reduced, and a quality guarantee cost can be reduced. Sixth, as the HSG is applied to a pulley structure of a vehicle, the durability and merchantability of the vehicle can be improved at the same time.

While the present disclosure has been described with respect to the specific forms, it will be apparent to those skilled in the art that various changes and modifications may be made without departing from the spirit and scope of the present disclosure.

What is claimed is:

1. A keyless rotation transfer unit comprising:
    a shaft extending from and configured to be rotated by a core of a hybrid starter and generator (HSG), the shaft including a shaft body, and a shaft end comprising a coupled section having a cylindrical portion and a portion with a plurality of shaft splines formed on an outer circumference thereof, and a threaded fixed section extending from the coupled section at a distal end of the shaft;
    a pulley having a pulley boss formed at one side thereof with a shaft hole extending therethrough, through which the shaft end is inserted, and a nut space formed at an opposing side, wherein a plurality of pulley splines is formed on an inner circumference of the shaft hole of the pulley, and wherein the shaft splines engage the pulley splines with a spline fit therebetween to form a pulley coupling force;
    a flange nut screw-fastened to the fixed section of the shaft end coming out of the shaft hole of the pulley, and housed within the nut space of the pulley to form a pulley holding force;
    a bearing coupled to the cylindrical portion of the shaft end and located at a rear of the pulley;
    wherein a length of the coupled section is equal to a sum of the length of the pulley splines and a width of the bearing; and
    wherein a diameter of the shaft end is smaller than a diameter of the shaft body to form a stepped portion therebetween, and wherein the stepped portion is configured to constrain the bearing when coupled to the shaft end; and
    a stopper disposed on the shaft body at a rear of the stepped portion, and abutted between the core and the bearing.

2. The keyless rotation transfer unit of claim 1, wherein:
    the length of the pulley splines is the same as the length of the shaft splines.

3. The keyless rotation transfer unit of claim 2, wherein the length of the pulley splines is set to ½ or more of an axial length of the shaft hole.

4. A hybrid starter and generator (HSG) comprising:
    a core; and
    a keyless rotation transfer unit comprising:
    a shaft extending from and configured to be rotated by the core, the shaft including a shaft body, and a shaft end comprising a coupled section having a cylindrical portion and a portion with a plurality of shaft splines formed on an outer circumference thereof, and a threaded fixed section extending from the coupled section at a distal end of the shaft;
    a pulley having a pulley boss formed at one side thereof with a shaft hole extending therethrough, through which the shaft end is inserted, and a nut space formed at an opposing side, wherein a plurality of pulley splines is formed on an inner circumference of the shaft hole of the pulley, and wherein the shaft splines engage the pulley splines with a spline fit therebetween to form a pulley coupling force;
    a flange nut screw-fastened to the fixed section of the shaft end, and housed within the nut space of the pulley to form a pulley holding force;
    a bearing coupled to the cylindrical portion of the shaft end and located at a rear of the pulley;
    wherein a length of the coupled section is equal to a sum of the length of the pulley splines and a width of the bearing; and
    wherein a diameter of the shaft end is smaller than a diameter of the shaft body to form a stepped portion therebetween, and wherein the stepped portion is configured to constrain the bearing when coupled to the shaft end; and
    a stopper disposed on the shaft body at a rear of the stepped portion, and abutted between the core and the bearing.

5. The hybrid starter and generator of claim 4, wherein the stopper has a larger diameter than a diameter of the coupled section and is installed on the shaft.

6. The hybrid starter and generator of claim 5, wherein the stopper is integrated with the shaft.

* * * * *